(No Model.)
J. F. PACK.
COOKING VESSEL.
No. 523,643.  Patented July 24, 1894.
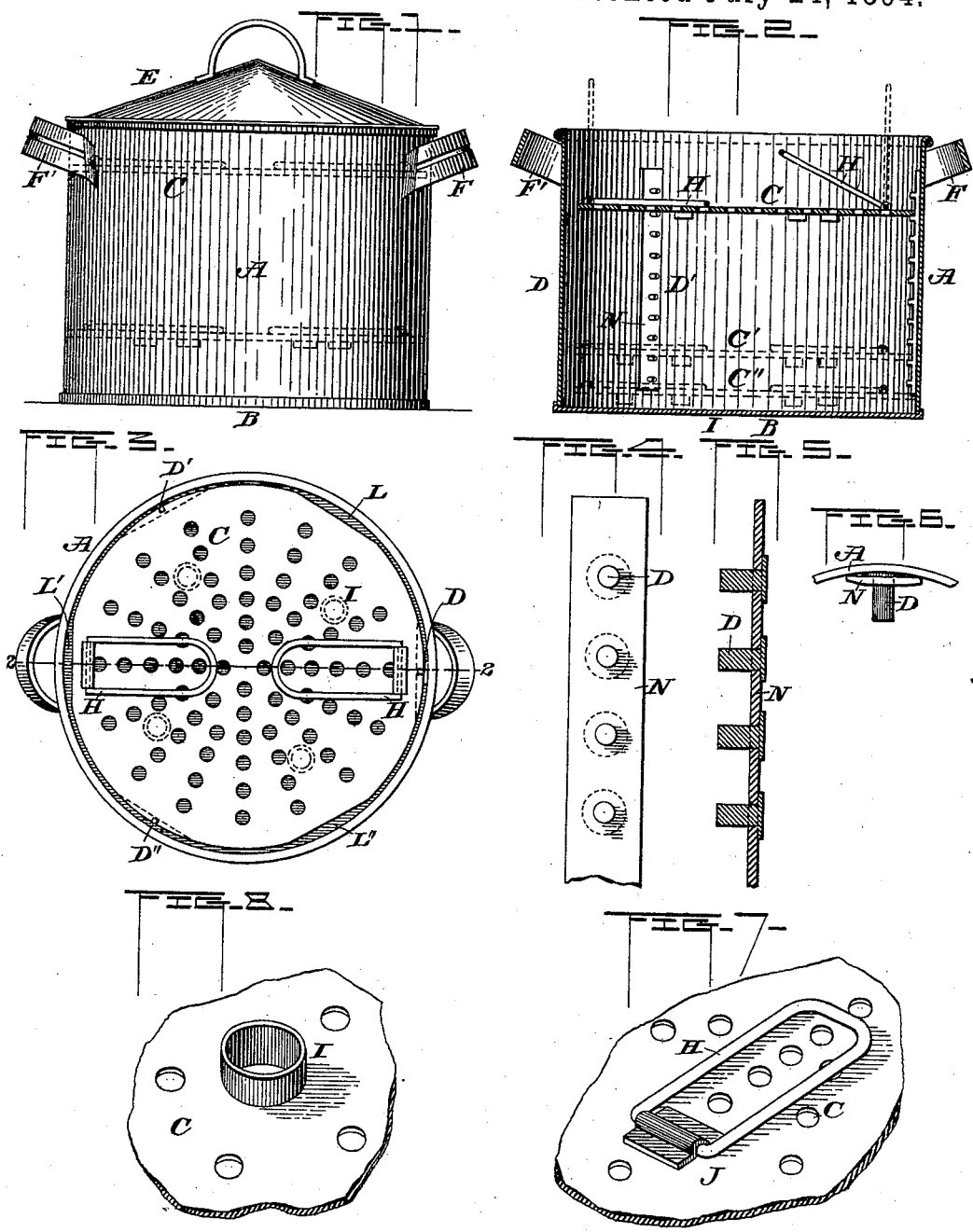
Witnesses
C. W. Smith
W. B. Sebastian
Inventor
John F. Pack
by L. A. Conner, Jr.
ass. Attorney
THE NORRIS PETERS CO., PHOTO-LITHO., WASHINGTON, D. C.

# UNITED STATES PATENT OFFICE.

JOHN F. PACK, OF ROCHESTER, NEW YORK, ASSIGNOR TO ALONZO D. McMASTER AND HENRY C. ALBEE, OF SAME PLACE.

COOKING-VESSEL.

SPECIFICATION forming part of Letters Patent No. 523,643, dated July 24, 1894.

Application filed February 8, 1894. Serial No. 499,511. (No model.)

*To all whom it may concern:*

Be it known that I, JOHN F. PACK, a citizen of the United States, residing at Rochester, in the county of Monroe, in the State of New York, have invented certain Improvements in Cooking-Vessels, of which the following is a specification, reference being had to the accompanying drawings.

My invention relates to certain improvements in the construction of culinary vessels, which improvements are fully described and illustrated in the following specification and the accompanying drawings,—the novel features thereof being specified in the claims annexed to the said specification.

In the accompanying drawings representing my improvements—Figure 1 is a side-elevation. Fig. 2 is a central vertical section, on the line 2—2, Fig. 3. Fig. 3 is a plan view. Fig. 4 represents the stops or pins on the interior of the vessel. Fig. 5 is a sectional view of the same. Fig. 6 is an edge view of the same. Fig. 7 represents a portion of the perforated plate having one of the folding handles attached thereto. Fig. 8 is a portion of the perforated plate inverted, showing one of the thimbles or supports attached thereto.

My improved cooking-vessel consists essentially of a cylindrical body A, having a tight bottom B, and an inner perforated plate, C, arranged to be adjusted within the body and secured at any desired distance above the bottom by means of the arrangement of rows of pins or lugs D, D' D'', on the interior surface of the body, as hereinafter described. The vessel is also preferably provided with the removable cover E, and the handles F F'.

The plate C is made of sheet metal of suitable thickness, being provided on the upper side with the handles H H', and on the lower side with the thimbles or projections I, which, as indicated at C'', Fig. 2, prevent it from coming into actual contact with the bottom B. The handles are attached to the plate by means of suitable hinges, as represented at J, Fig. 7. The edge of the plate is notched or cut away at three equidistant points, as represented at L L' L'', Fig. 3, so that it can be disengaged from the pins D D' D'' by turning the plate horizontally, until the notches come opposite the pins, as indicated by the dotted lines in Fig. 3, in which position the plate can be raised or depressed,—being again secured in place by turning it so its circular edges engage with some of the pins. The pins may be attached to the body in any suitable way, but I have found in practice that the manner of attaching them indicated in Figs. 4, 5 and 6 is cheap and practical.

N is a strip of metal perforated with a series of holes at equal distances apart of a diameter adapted to receive the stems of the rivets D. After the rivets have been inserted in the holes, the strip N is soldered onto the inner surface of the body A. The rivets may also be soldered in the strip before it is attached. It will be observed that the three rows of pins are arranged vertically at equal distances apart, and that the corresponding pins in each of the rows are placed at equal distances from the bottom.

The advantages of my improved cooking vessel will be apparent to any one acquainted with the culinary art. It may be used with great advantage for canning fruits, in which case the perforated plate will keep the fruit down in the sirup, so that it will all cook or boil alike, thus avoiding any stirring, and preventing the breaking up of the fruit, leaving the sirup clear and the fruit whole.

Another use of my invention is for boiled puddings, in which case the pudding is placed on the perforated plate, and the usual arrangements for preventing its burning at the bottom are dispensed with.

For straining the water off potatoes, beets, corn, &c., the plate will retain the vegetables within the vessel, while the hot water is poured off without burning the fingers.

Many other uses, such as steaming pot-pies or dumplings, will occur to the experienced cook.

I claim—

1. In a cooking utensil, in combination with the cylindrical vessel; of a series of pins, arranged vertically at equi-distant intervals around the inner wall of said vessel, said pins projecting through perforated supporting strips secured to said vessel, said pins having an enlarged portion confined between said strip and the inner wall of the vessel, a perforated plate, provided with a series of cut away portions upon its periphery corresponding to the number of vertical series of pins, which project at equi-distant intervals from the inner wall of the vessel, said pins supporting the perforated plate at the desired height, substantially as described.

2. In a cooking utensil, in combination with the cylindrical vessel, of a series of pins, arranged in vertical alignment and arranged at equi-distant intervals around the inner wall of the vessel, supporting strips, perforated to receive said pins, a flat disk-shaped head upon each of said pins confined between the inner wall of the vessel and said supporting strip, said strip being soldered to said inner wall of the vessel, a perforated plate, having a series of notches in its periphery arranged to correspond to the number of equi-distant vertical series of pins, so as to register therewith and permit removal, when said plate is turned in a horizontal plane from the position said parts assume when said plate is supported by said pin.

JOHN F. PACK.

Witnesses:
GEO. B. SELDEN,
G. S. DEY.